United States Patent
Suzuki

(10) Patent No.: US 7,990,575 B2
(45) Date of Patent: Aug. 2, 2011

(54) COLOR PROCESSING APPARATUS AND METHOD FOR PERFORMING GAMUT MAPPING

(75) Inventor: Takahiro Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 11/945,618

(22) Filed: Nov. 27, 2007

(65) Prior Publication Data
US 2008/0123164 A1    May 29, 2008

(30) Foreign Application Priority Data
Nov. 29, 2006   (JP) ................. 2006-322523

(51) Int. Cl.
*G06F 15/00* (2006.01)
*H04N 1/40* (2006.01)
*H04N 1/46* (2006.01)
*G03F 3/08* (2006.01)
*G06K 9/00* (2006.01)

(52) U.S. Cl. ........ 358/1.9; 358/518; 358/3.01; 358/525; 382/162

(58) Field of Classification Search .................. None
See application file for complete search history.

(56) References Cited

U.S. PATENT DOCUMENTS

| | | | |
|---|---|---|---|
| 6,434,266 B1 | 8/2002 | Kanno et al. | 382/162 |
| 6,724,507 B1 * | 4/2004 | Ikegami et al. | 358/518 |
| 7,760,406 B2 * | 7/2010 | Shigeta | 358/518 |
| 2002/0031256 A1 * | 3/2002 | Hiramatsu et al. | 382/162 |
| 2002/0097907 A1 | 7/2002 | Fukasawa | 382/167 |
| 2005/0219585 A1 | 10/2005 | Suzuki et al. | 358/1.9 |
| 2005/0219586 A1 | 10/2005 | Suzuki et al. | 358/1.9 |
| 2007/0053023 A1 | 3/2007 | Suzuki et al. | 358/518 |
| 2007/0236506 A1 | 10/2007 | Tin | 345/590 |

* cited by examiner

*Primary Examiner* — Twyler L Haskins
*Assistant Examiner* — Barbara D Reinier
(74) *Attorney, Agent, or Firm* — Fitzpatrick, Cella, Harper & Scinto

(57) ABSTRACT

A correction region of an input gamut is set in accordance with the chroma of a specific color point of the input gamut, and a correction region of an output gamut is set in accordance with the chroma of a specific color point of the output gamut. The output gamut is corrected based on the correction region of the output gamut so that the specific color point of the output gamut is mapped on a point on the lightness axis of a color space, and input color data is corrected so that the specific color point of the input gamut is mapped on a point on the lightness axis of the color space. The corrected color data is mapped into the corrected output gamut, and inverse correction of correction of the output gamut is performed to the mapped color data based on the correction region of the output gamut.

5 Claims, 18 Drawing Sheets

FIG. 5

| R | G | B | L | a | b |
|---|---|---|---|---|---|
| 0 | 0 | 0 | **** | **** | **** |
| 0 | 0 | 32 | **** | **** | **** |
| 0 | 0 | 64 | **** | **** | **** |
| ⋮ | ⋮ | ⋮ | **** | **** | **** |
| 64 | 128 | 160 | ⋮ | ⋮ | ⋮ |
| 64 | 128 | 192 | ⋮ | ⋮ | ⋮ |
| 64 | 128 | 224 | ⋮ | ⋮ | ⋮ |
| ⋮ | ⋮ | ⋮ | ⋮ | ⋮ | ⋮ |
| 255 | 255 | 224 | ⋮ | ⋮ | ⋮ |
| 255 | 255 | 255 | **** | **** | **** |

F I G. 7
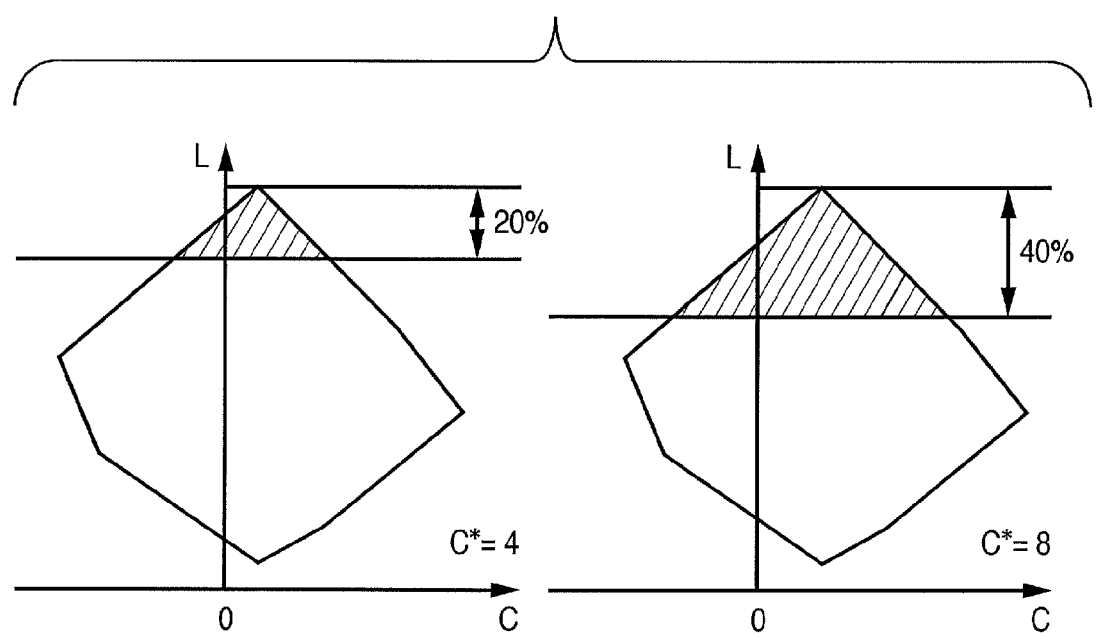

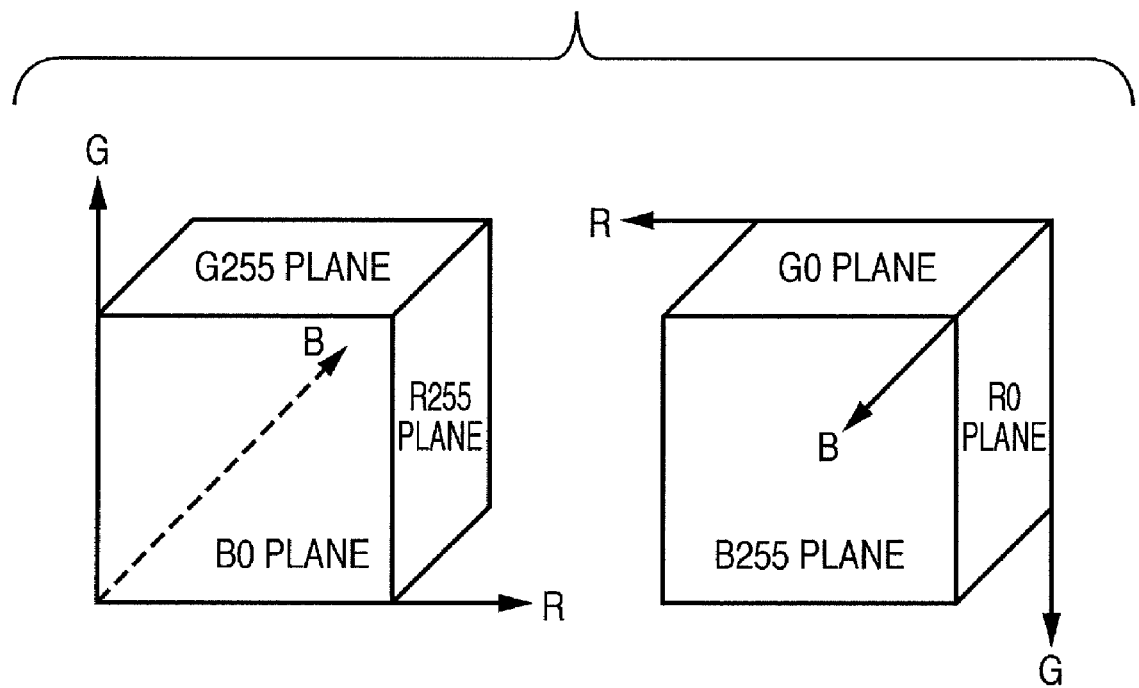
F I G. 15

F I G. 16
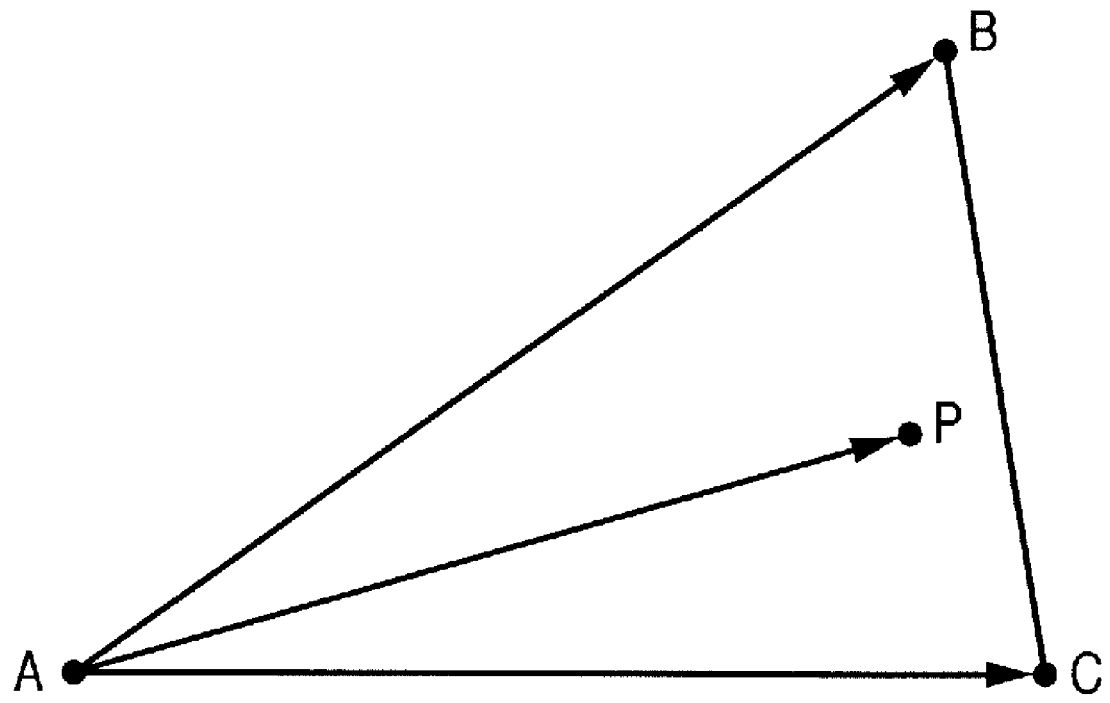
$$\vec{AP} = s\vec{AB} + t\vec{AC}$$

COLOR PROCESSING APPARATUS AND METHOD FOR PERFORMING GAMUT MAPPING

BACKGROUND OF THE INVENTION

1. Field of the Invention

The present invention relates to color processing for color-converting color data of the first color gamut into that of the second color gamut.

2. Description of the Related Art

Recently, opportunities are increasing to input an image by an input device such as a digital camera, color scanner, or the like, to display the image by using an image display device such as a CRT, LCD, or the like, and to output the image by an output device such as a color printer or the like. In this case, color matching is generally performed to absorb differences in color impression in image caused by differences between a color gamut (to be referred to as an "input gamut" hereinafter) of a color space in which the input device records an image and a color gamut (to be referred to as an "output gamut" hereinafter) of the display device or output device. More specifically, color matching is performed to map an input gamut into an output gamut, thereby correcting differences in color impression in image between the devices.

One method of color gamut mapping is referred to as colorimetric mapping which colorimetrically matches colors. Colorimetric mapping maps not colors in a common region of an input gamut and output gamut but colors in their non-common region. When the output gamut is narrower than the input gamut, colors outside the output gamut are mapped into the boundary surface of the output gamut. More specifically, colorimetric mapping is a mapping method devised to match absolute color values on a colorimetric space.

Assume that the white point of an input device is different from that of an output device. In this case, when colorimetric mapping is performed for a color which is white in the input device, the color is sometimes reproduced unnaturally by the output device. In order to avoid this, a mapping method called relative colorimetric mapping is available. In this method, before performing colorimetric mapping, the color gamuts of the input and output devices are corrected to match their white points, so that the white point of the input device is reproduced as that of the output device. As a color gamut correction (white point correction) method in relative colorimetric mapping, for example, a technique described in US Patent Application Publication No. 2002/0097907 is available. When the white point of an input device is different from that of an output device, this technique scales the white point of the output device in an XYZ space to match the white points of the input and output devices.

However, when color gamut mapping described in US Patent Application Publication No. 2002/0097907 is performed, an output gamut largely shifts in a colorimetric space, as shown in FIG. 1 in which the uncorrected color gamut is represented by the solid lines and the corrected color gamut is represented by the broken lines. For this reason, color impression in image of the input image largely changes after relative colorimetric mapping. Therefore, the original purpose of colorimetric mapping to match absolute color values in a colorimetric space is not achieved.

The above-described problem also arises when black points of input and output devices are matched. In other words, the above-described problem arises when performing colorimetric matching by matching a specific color point including the white or black point on the neutral axis in the color gamut of an input device to that of an output device.

SUMMARY OF THE INVENTION

In one aspect, a color processing method comprising the steps of: setting a correction region of an input gamut in accordance with a chroma of a specific color point of the input gamut, and setting a correction region of an output gamut in accordance with a chroma of a specific color point of the output gamut; correcting the output gamut based on the correction region of the output gamut so that the specific color point of the output gamut is mapped on a point on a lightness axis of a color space; correcting input color data so that the specific color point of the input gamut is mapped on a point on the lightness axis of the color space; mapping the corrected color data into the corrected output gamut; and performing inverse correction of correction executed in the gamut correction step to the mapped color data based on the correction region of the output gamut.

According to the aspect, when mapping is performed to colorimetrically match colors between devices of two types which have different specific color points on the neutral axes of the color gamuts, the specific color points of the color gamuts of the two devices are matched and a change in color impression in image of the entire image before and after the mapping is suppressed.

Further features of the present invention will become apparent from the following description of exemplary embodiments (with reference to the attached drawings).

BRIEF DESCRIPTION OF THE DRAWINGS

FIG. 5 is a view for explaining the description format of color gamut data;

FIG. 7 shows views for explaining a correction region;

FIG. 15 shows views for explaining color gamut surfaces;

FIG. 16 is a view for explaining inside/outside determination using a triangular patch;

DESCRIPTION OF THE EMBODIMENTS

Preferred embodiments of the present invention will now be described in detail in accordance with the accompanying drawings.

Relative colorimetric mapping performed by matching white points between two device gamuts which have different white points will be described below. However, as will be described later, the method described in this embodiment can be applied to a case wherein relative colorimetric mapping is performed by matching black points between two device gamuts which have different black points. In the other words, the method described in this embodiment performs relative colorimetric matching by matching a specific color point such as a white point and black point on the neutral axis of the color gamut of an input device to that of an output device.

First Embodiment

Arrangement of Apparatus

Figure 1:
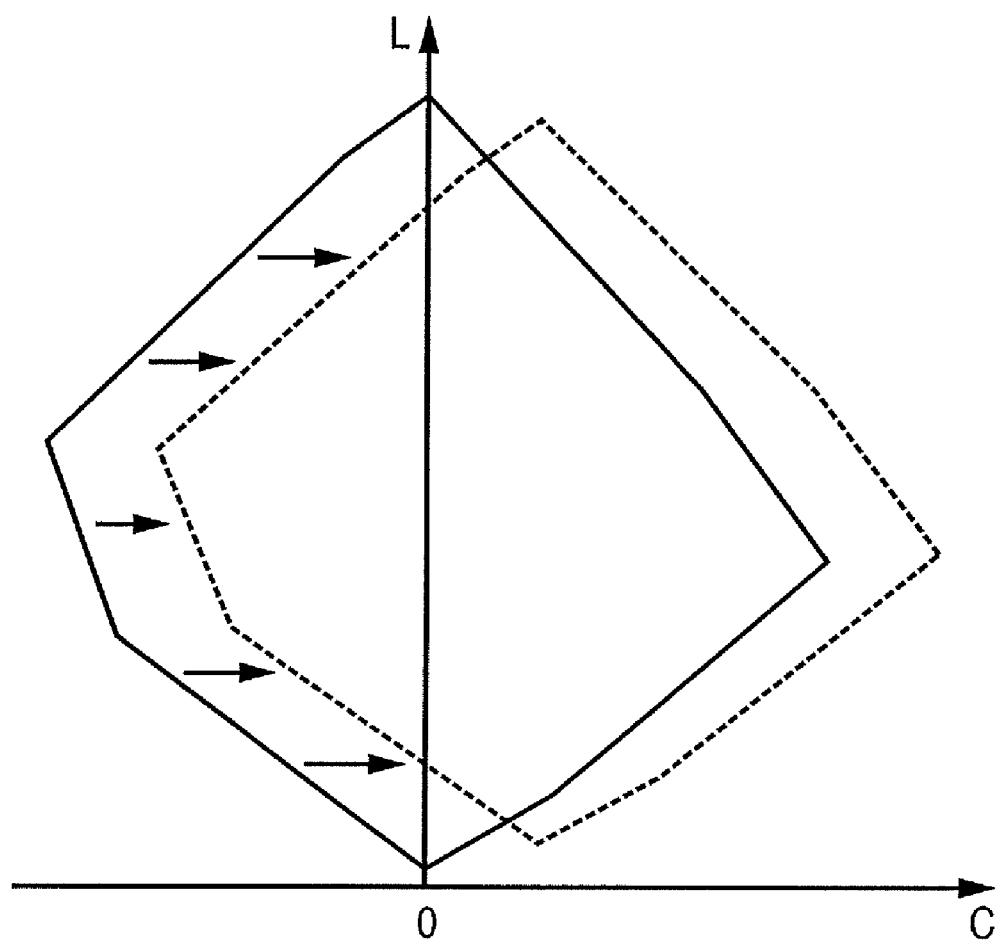
FIG. 1 is a view showing how to match the white points of input and output devices when the two devices have different white points.
Figure 2:
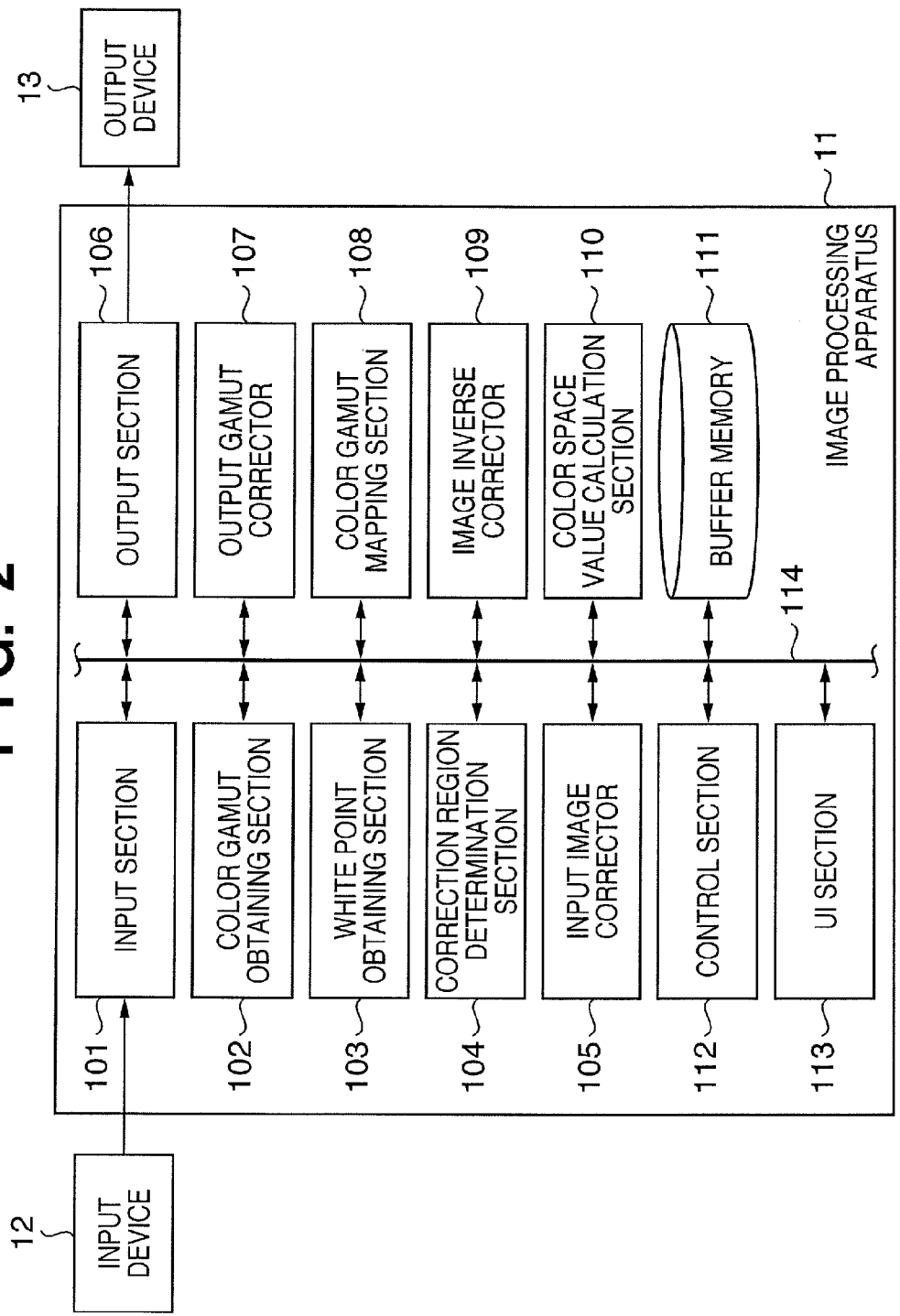
FIG. 2 is a block diagram showing the arrangement of an image processing apparatus.

FIG. 2 is a block diagram showing the arrangement of an image processing apparatus 11.

An input section 101 is an interface to input image data from an input device 12 such as a digital camera. An output section 106 is an interface to output image data to an output device 13 such as a printer. The input section 101 and output section 106 can use a serial bus interface such as a USB (Universal Serial Bus) or IEEE1394, or a network interface. A memory card reader may be used as the input section 101, and image data may be input from a memory card.

A color gamut obtaining section 102 obtains color gamut data which indicate the color gamuts of the input device 12 and output device 13. A white point obtaining section 103 obtains white point data which indicate the white points of the input device 12 and output device 13.

A correction region determination section 104 determines a correction region of the input gamut and that of the output gamut based on the white point data obtained by the white point obtaining section 103. An input image corrector 105 performs color correction of the input image data based on the correction region of the input gamut determined by the correction region determination section 104. An output gamut corrector 107 corrects the output gamut indicated by the color gamut data of the output device 13 based on the correction region of the output gamut determined by the correction region determination section 104.

A color gamut mapping section 108 maps the image data corrected by the input image corrector 105 into the output gamut (corrected output gamut) corrected by the output gamut corrector 107. An image inverse corrector 109 applies an inverse process (inverse correction) of the correction process executed for the output gamut by the output gamut corrector 107 to image data mapped into the corrected output gamut by the color gamut mapping section 108. A color space value calculation section 110 converts the image data that underwent the inverse correction by the image inverse corrector 109 into image data of the color space of the output device 13.

A buffer memory 111 is a memory such as an RAM (random access memory) or the like. The process of each section described-above is executed based on image data, color gamut data, and white point data stored in the buffer memory 111. Each section uses the buffer memory 111 to temporarily store operation results during the process.

A control section 112 controls the above-described components through a system bus 114 to execute image processing to be described later. At that time, a user interface for inputting user's instructions and displaying the progress of the process is displayed on a user interface (UI) section 113. Note that user's instructions are input through pointing devices such as a keyboard and mouse (neither is shown) connected to the input section 101.

[Image Processing]

Figure 3:
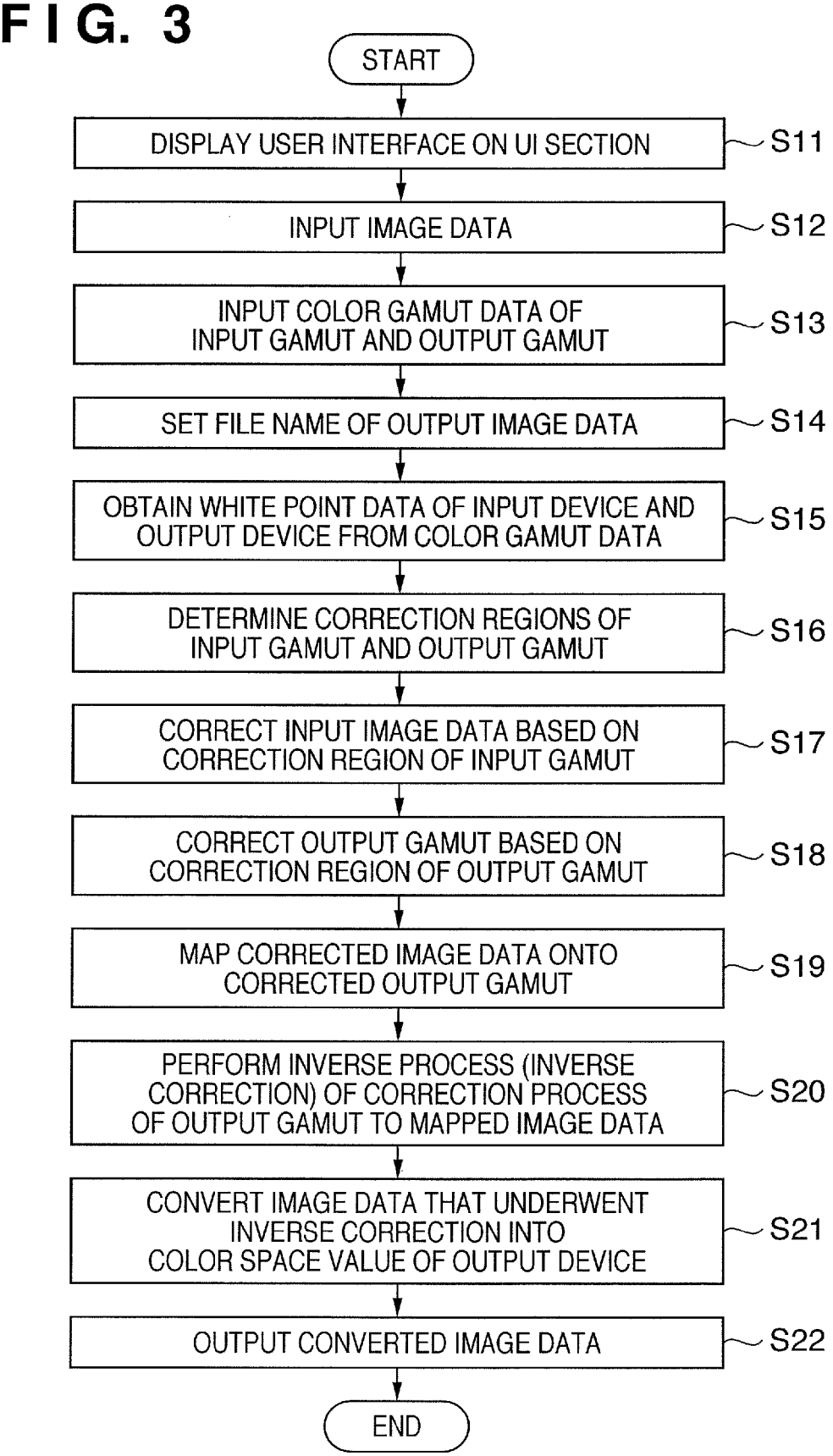
FIG. 3 is a flowchart for explaining image processing executed by the image processing apparatus.

FIG. 3 is a flowchart for explaining image processing executed by the image processing apparatus 11, which is executed under the control of the control section 112.

Figure 4:
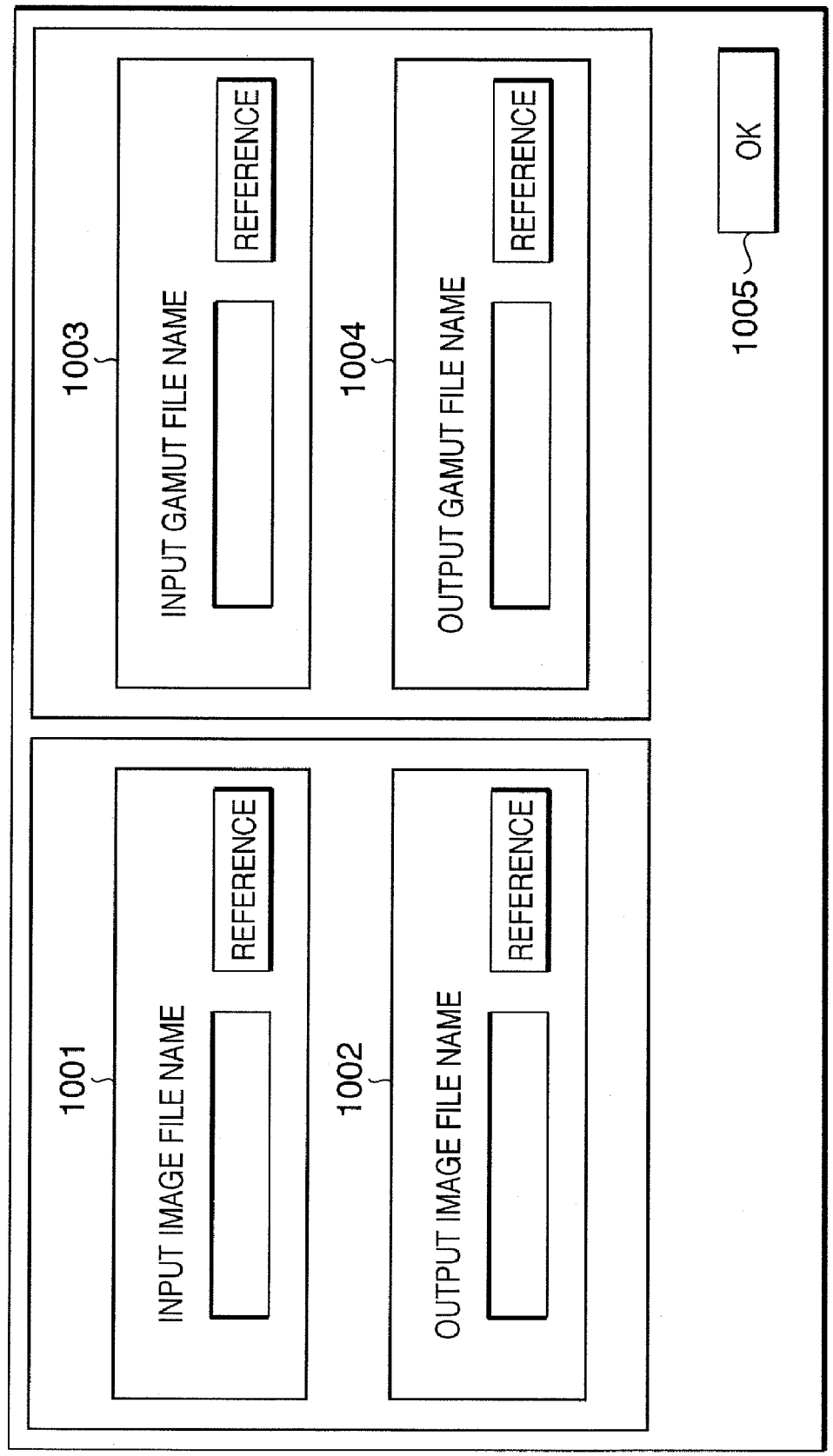
FIG. 4 is a view showing an example of a user interface.

First, the control section 112 displays a user interface shown in FIG. 4 on the UI section 113 (S11). In accordance with user's instructions input through the user interface, the control section 112 controls the input section 101 to input image data (S12), controls the color gamut obtaining section 102 to input color gamut data of an input gamut and output gamut (S13), and sets the file name of output image data (S14). Note that obtained image data and color gamut data are stored in the buffer memory 111.

The user interface shown in FIG. 4 includes designation parts 1001 to 1004 which are used by a user to designate the file names of input image data, output image data, input gamut, and output gamut. When the user inputs the file names to these designation parts 1001 to 1004 and presses an OK button 1005, the control section 112 executes the processing in steps S12 to S14. Note that image data and color gamut data are not limited to be input from the input device 12 and be output to the output device 13. For example, when the input section 101 is connected to a network, they may be input/output from/to a server on the network.

FIG. 5 is a view for explaining the description format of color gamut data. Color gamut data represents correspondence between 9-sliced device R, G, and B values of R, G, and B values (8 bits), and the colorimetric values (e.g., CIELab values) of the colors obtained by inputting the device R, G, and B values into the device.

The control section 112 controls the white point obtaining section 103 to obtain white point data of the input device 12 and output device 13 from the color gamut data and store the obtained data in the buffer memory 111 (S15). White point data exists in color gamut data. For example, in case of an RGB device, a CIELab value corresponding to (R,G,B)=(255,255,255) is white point data. In case of a CMYK device, a CIELab value corresponding to (C,M,Y,K)=(0,0,0,0) is white point data.

The control section 112 then controls the correction region determination section 104 to determine a correction region of the input gamut based on the white point data of the input device 12. The control section 112 also determines a correction region of the output gamut based on the white point data of the output device 13 (S16). A detailed process of the correction region determination section 104 will be described later.

The control section 112 controls the input image corrector 105 to correct the input image data based on the correction region of the input gamut (S17). The control section 112 controls the output gamut corrector 107 to correct the output gamut based on the correction region of the output gamut (S18). Detailed descriptions of the process of the input image corrector 105 and that of the output gamut corrector 107 will be given later.

The control section 112 controls the color gamut mapping section 108 to map the corrected image data into the corrected output gamut (S19). The control section 112 controls the image inverse corrector 109 to perform to the mapped image data an inverse process (inverse correction) of the correction process executed for the output gamut by the output gamut corrector 107 (S20). Detailed descriptions of the process of the color gamut mapping section 108 and that of the inverse corrector 109 will be given later, The control section 112 controls the color space value calculation section 110 to convert the image data that underwent the inverse correction into a color space value of the output device 13 (S21). The control section 112 controls the output section 106 to output the image data having the color space value of the output device 13 and stored in the buffer memory 111 to the output device 13 or a server (not shown) (S22). A detailed description of the process of the color space value calculation section 110 will be given later. The file name of the image data to be output is that set in step S14.

[Correction Region Determination Section]

The process (S16) executed by the correction region determination section 104 for determining the correction region of the input gamut by using the white point data of the input device 12 and determining the correction region of the output gamut by using the white point data of the output device 13 will be described next. Note that the method of determining the correction region of the input gamut will be described below, but the method of determining the correction region of the output gamut is the same.

Figure 6:
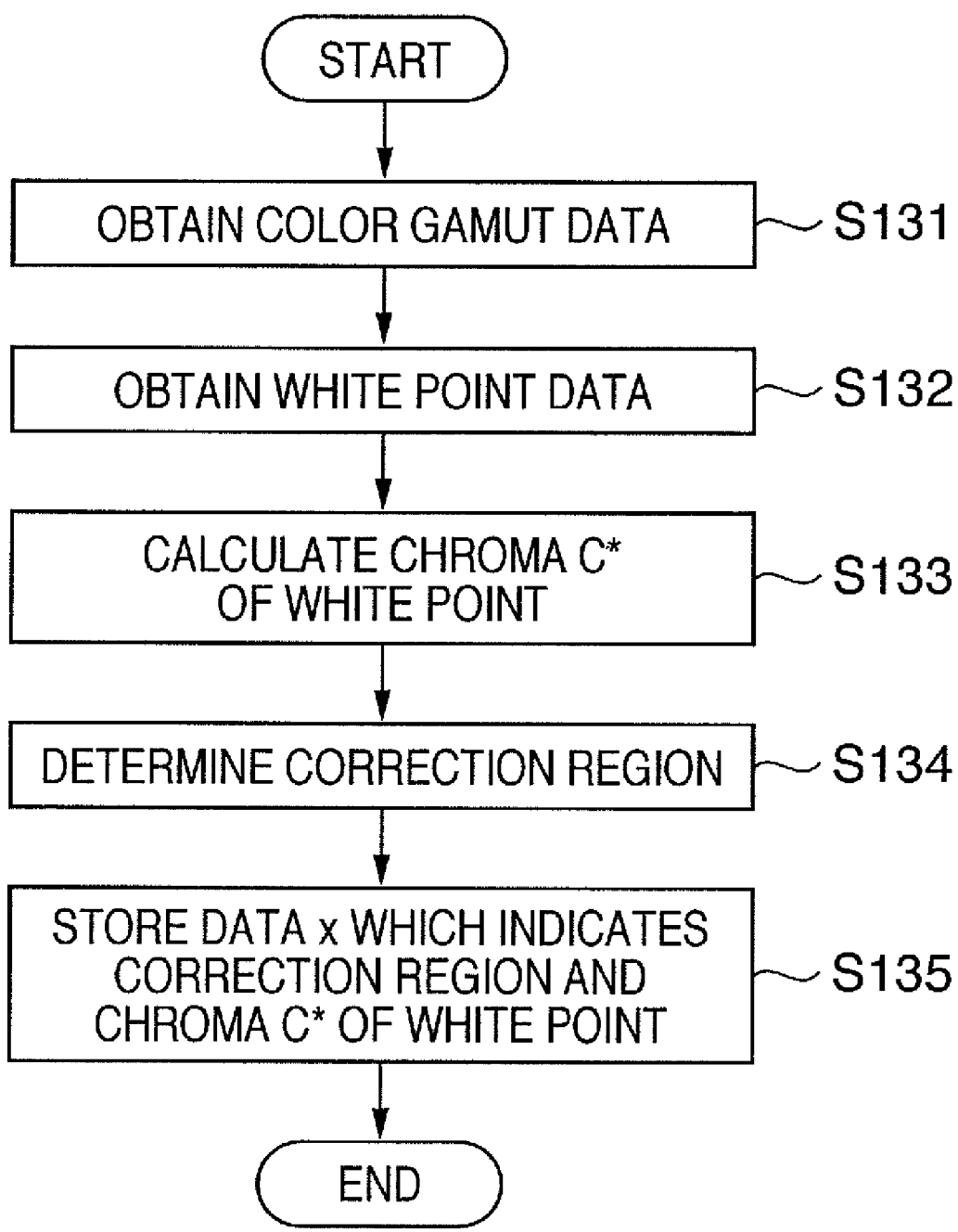
FIG. 6 is a flowchart for explaining the process of a correction region determination section.

FIG. 6 is a flowchart for explaining the process of the correction region determination section 104.

The correction region determination section 104 obtains color gamut data which indicates the input gamut from the buffer memory 111 (S131), and obtains white point data (CIELab value) of the input device 12 from the buffer memory 111 (S132). The correction region determination section 104 calculates a chroma C* of the white point of the input device 12 by using equation (1) (S133). The chroma C* of the white point indicates a gap value from a lightness L axis.

$$C^* = \sqrt{(a^{*2} + b^{*2})} \quad (1)$$

where a* and b* are the chromaticity values of the white point.

The correction region determination section 104 determines the correction region of the input gamut based on the chroma C* of the white point. The correction region determination section 104 determines x % from the high-lightness side in the lightness range of the input gamut as the correction region by using, for example:

when $C^* \leq 8, x = 5 \cdot C^*$ [%]

when $C^* > 8, x = 40$ [%] (2)

FIG. 7 shows views for explaining the correction region. According to equation (2), the larger the chroma C* of the white point is, that is, the larger the gap of the white point from the lightness L axis is, the more the correction region increases. When equation (2) is employed, the correction region is determined as follows. As shown in FIG. 7, when C*=4, 20% from the high-lightness side in the lightness range of the input gamut is determined as the correction region. When C*>8, 40% from the high-lightness side in the lightness range of the input gamut is determined as the correction region.

The correction region determination section 104 stores an x value which indicates the lightness range of the correction region and the chroma C* of the white point in the buffer memory 111 (S135), thus ending the process.

The process shown in FIG. 6 is executed when determining the correction region of the input gamut and when determining the correction region of the output gamut.

[Input Image Corrector]

The correction process (S17) of input image data based on the correction region of the input gamut, which is executed by the input image corrector 105, will be described next.

Figure 8:
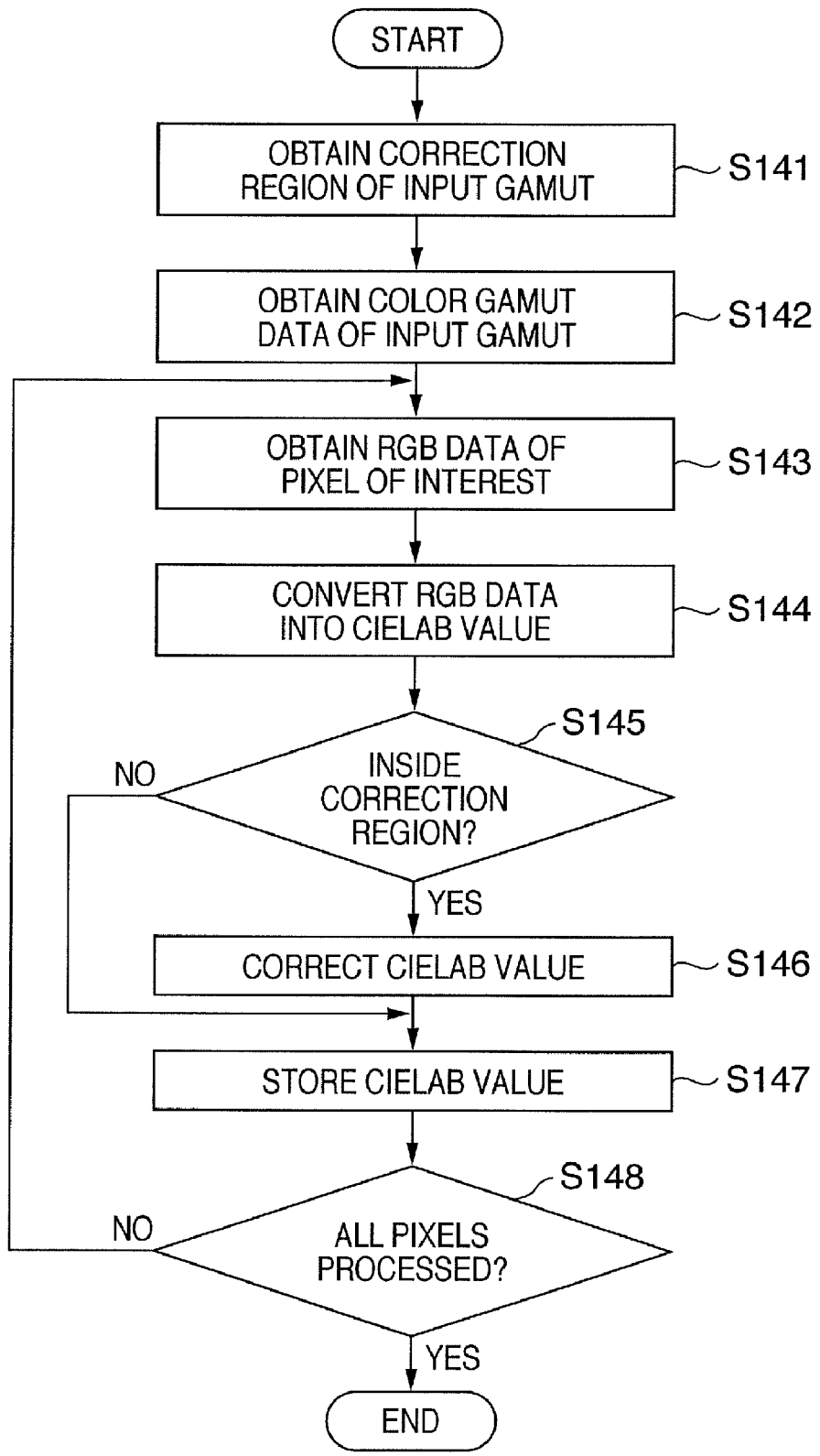
FIG. 8 is a flowchart for explaining the process of an input image corrector.

FIG. 8 is a flowchart for explaining the process of the input image corrector 105.

The input image corrector 105 obtains the x value which indicates the lightness range of the correction region of the input gamut from the buffer memory 111 (S141), and obtains the color gamut data which indicates the input gamut from the buffer memory 111 (S142).

The input image corrector 105 obtains the RGB value of a pixel of interest of the input image data from the buffer memory 111 (S143), and converts the obtained RGB value into a CIELab value by using the color gamut data of the input gamut and, for example, tetrahedral interpolation (S144). When tetrahedral interpolation is used, a CIELab value corresponding to the RGB value of a pixel of interest is estimated from four CIELab values corresponding to the RGB values of the four vertices of a tetrahedron which includes the RGB value of the pixel of interest.

The input image corrector 105 determines whether a lightness value L of the pixel of interest falls inside the lightness range corresponding to the correction region of the input gamut (S145). When the lightness value L of the pixel of interest falls inside the lightness range, the input image corrector 105 corrects the CIELab value of the pixel of interest (S146).

Figure 9:
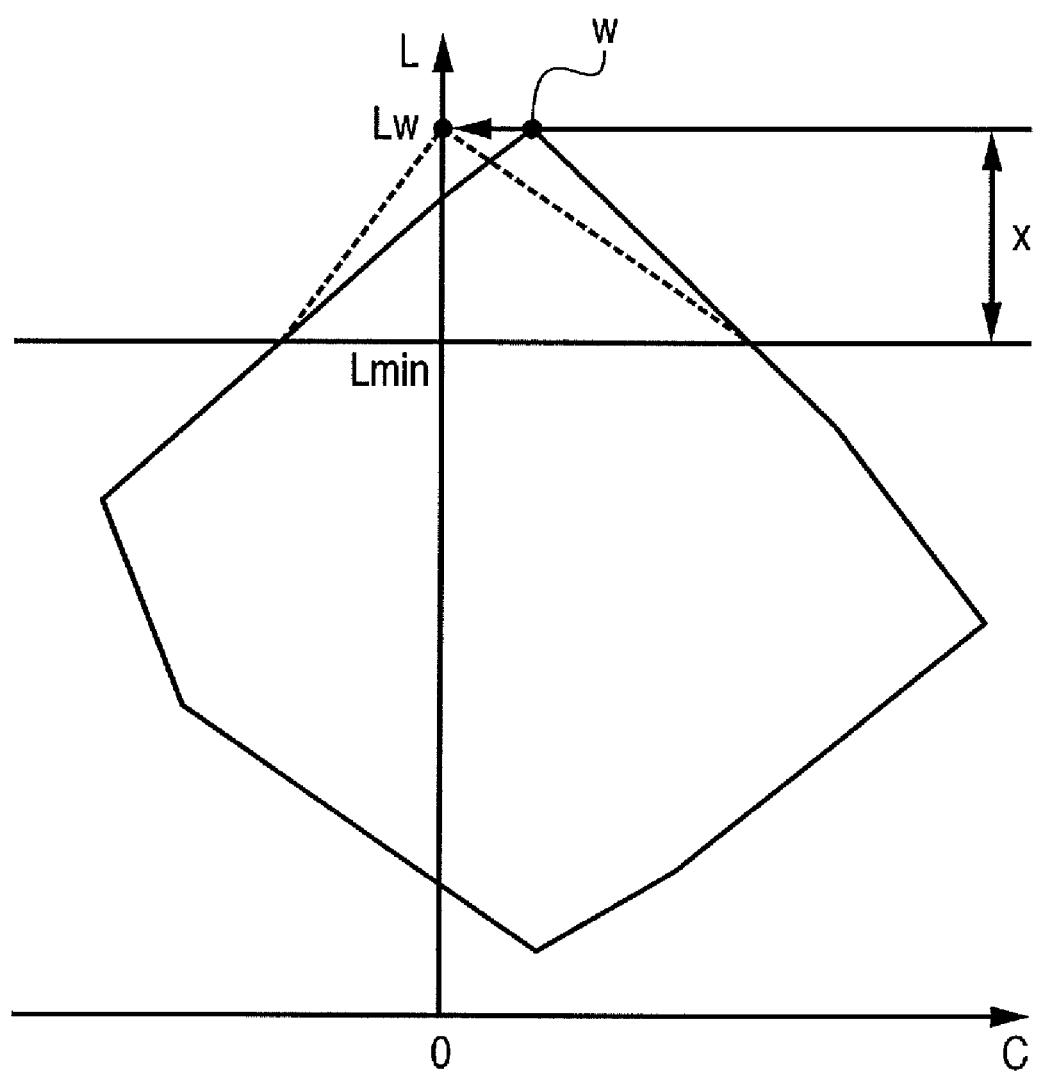
FIG. 9 is a view for explaining the concept of a correction process in step S146.

FIG. 9 is a view for explaining the concept of the correction process in step S146.

The input image corrector 105 moves a white point W onto the lightness L axis while keeping a lightness value L of the white point W of the input device 12 unchanged. Along with the movement of the white point W, a correction process for moving the correction region of the input gamut represented by the solid lines in FIG. 9 to the region represented by the broken lines in FIG. 9 is executed. When the chromaticity values of the white point W are aw and bw, the movement amounts (correction amounts) of the white point W in the a* direction and b* direction are −aw and −bw, respectively. Note that the lower limit of the correction amount of the white point W is 0 in each direction. Therefore, correction amounts Xa and Xb of the pixel of interest can be calculated by linear interpolation expressed by:

$$Xa = -aw \cdot (Li - Lmin)/(Lw - Lmin)$$

$$Xb = -bw \cdot (Li - Lmin)/(Lw - Lmin) \quad (3)$$

where −aw and −bw are the correction amounts of the white point W;

Li is the lightness value of the pixel of interest;

Lw is the lightness value of the white point; and

Lmin is the lightness value of the lower limit of the correction region.

The input image corrector 105 calculates the correction amounts Xa and Xb corresponding to the pixel of interest by using equation (3). The input image corrector 105 adds the correction amounts Xa and Xb to chromaticity values a and b of the pixel of interest, respectively.

The input image corrector 105 stores the CIELab value of the pixel of interest in a predetermined area of the buffer memory 111 (S147), and determines whether all the pixels of the input image data have been processed (S148). Until all the pixels have been processed, the processing in steps S143 to S147 is repeated.

[Output Gamut Corrector]

The correction process (S18) of the output gamut based on the correction region of the output gamut, which is executed by the output gamut corrector 107, will be described next.

Figure 10:
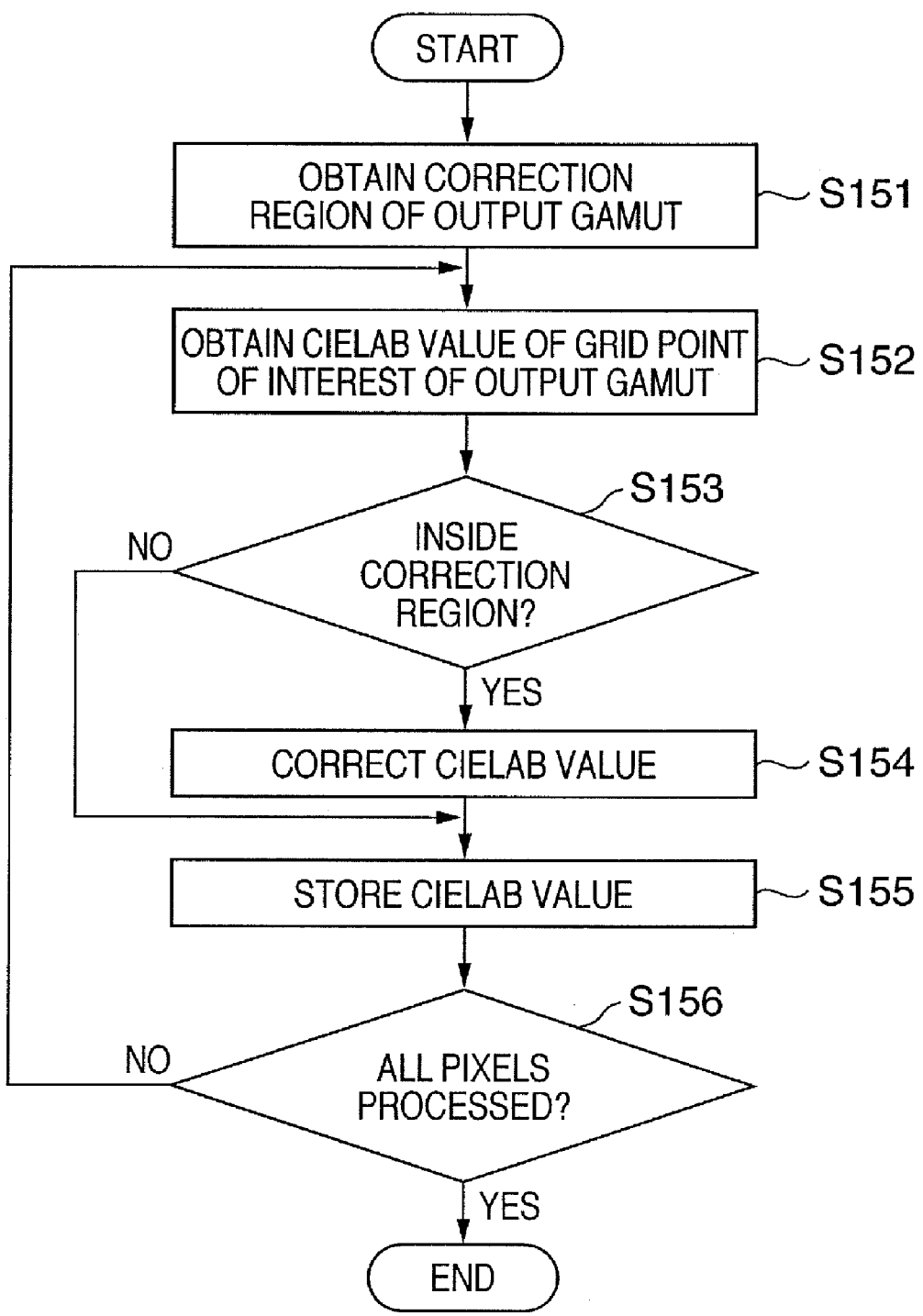
FIG. 10 is a flowchart for explaining the process of an output gamut corrector.

FIG. 10 is a flowchart for explaining the process of the output gamut corrector 107.

The output gamut corrector 107 obtains the x value which indicates the lightness range of the correction region of the output gamut from the buffer memory 111 (S151). The output gamut corrector 107 then obtains the CIELab value of one grid point (to be referred to as a grid point of interest hereinafter) from the color gamut data which is stored in the buffer memory 111 and indicates the output gamut (S152). As shown in FIG. 5, the color gamut data represents the correspondence between the device values obtained by uniformly slicing the respective component values of the device value and the colorimetric values. In step S152, the output gamut corrector 107 sequentially obtains colorimetric values corresponding to the respective device values.

The output gamut corrector 107 determines whether a lightness value L of the grid point of interest falls inside the lightness range corresponding to the correction region of the output gamut (S153). When the lightness value L of the grid point of interest falls inside the lightness range, the output gamut corrector 107 corrects the CIELab value of the grid point of interest (S154).

The correction method of the CIELab value of the grid point of interest is the same as that of the CIELab value of the pixel of interest in step S146, and a detailed description will not be repeated. Note that in case of a grid point of interest, Li of equation (3) is the lightness value of the grid point of interest, Lw is the lightness value of the white point of the output device, and Lmin is the lightness value of the lower limit of the correction region of the output gamut.

The output gamut corrector 107 stores the CIELab value of the grid point of interest in a predetermined area of the buffer memory 111 (S155), and determines whether all the grid points of the color gamut data which indicates the output gamut have been processed (S156). Until all the grid points have been processed, the processing in steps S152 to S155 is repeated.

When the above-described process by the output gamut corrector 107 is complete, the corrected color gamut data which has the same description format as in FIG. 5 and describes the relationship between the RGB values and CIELab values of the grid point have been stored in the buffer memory 111. Note that the calculated corrected color gamut data can be stored in, for example, a server, in association with the output gamut file name or the identifier of the output device 13. Therefore, when the corrected color gamut data is obtained by retrieving it from the server based on the output gamut file name designated by the user, there is no need to calculate the corrected color gamut data each time.

[Color Gamut Mapping Section]

The process (S19) for mapping the corrected image data into the corrected output gamut by the color gamut mapping section 108 will be described next.

Figure 11:
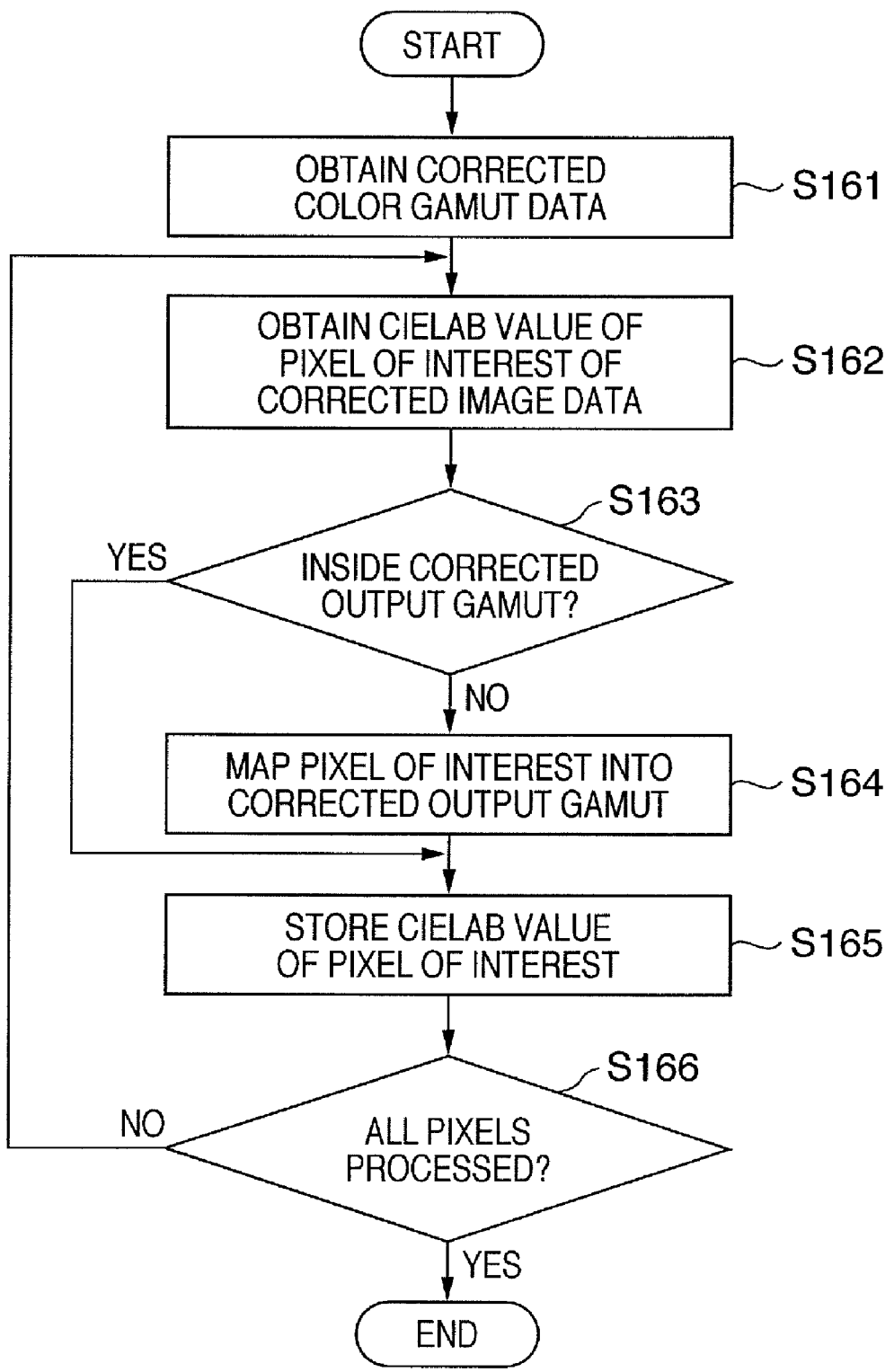
FIG. 11 is a flowchart for explaining the process of a color gamut mapping section.

FIG. 11 is a flowchart for explaining the process of the color gamut mapping section 108.

The color gamut mapping section 108 obtains the corrected color gamut data from the buffer memory 111 (S161), and obtains the CIELab value of the pixel of interest of the corrected image data stored in the buffer memory 111 (S162).

The color gamut mapping section 108 determines whether the CIELab value of the pixel of interest falls inside the output gamut (corrected output gamut) indicated by the corrected color gamut data (S163). When the CIELab value of the pixel of interest is determined to fall outside the corrected output gamut, the color gamut mapping section 108 maps that CIELab value into the corrected output gamut (S164).

The color gamut mapping section 108 stores the CIELab value of the pixel of interest in a predetermined area of the buffer memory 111 (S165), and determines whether all the pixels of the corrected image data have been processed (S166). Until all the pixels have been processed, the processing in steps S162 to S165 is repeated.

Color Gamut Inside/Outside Determination

Figure 12:
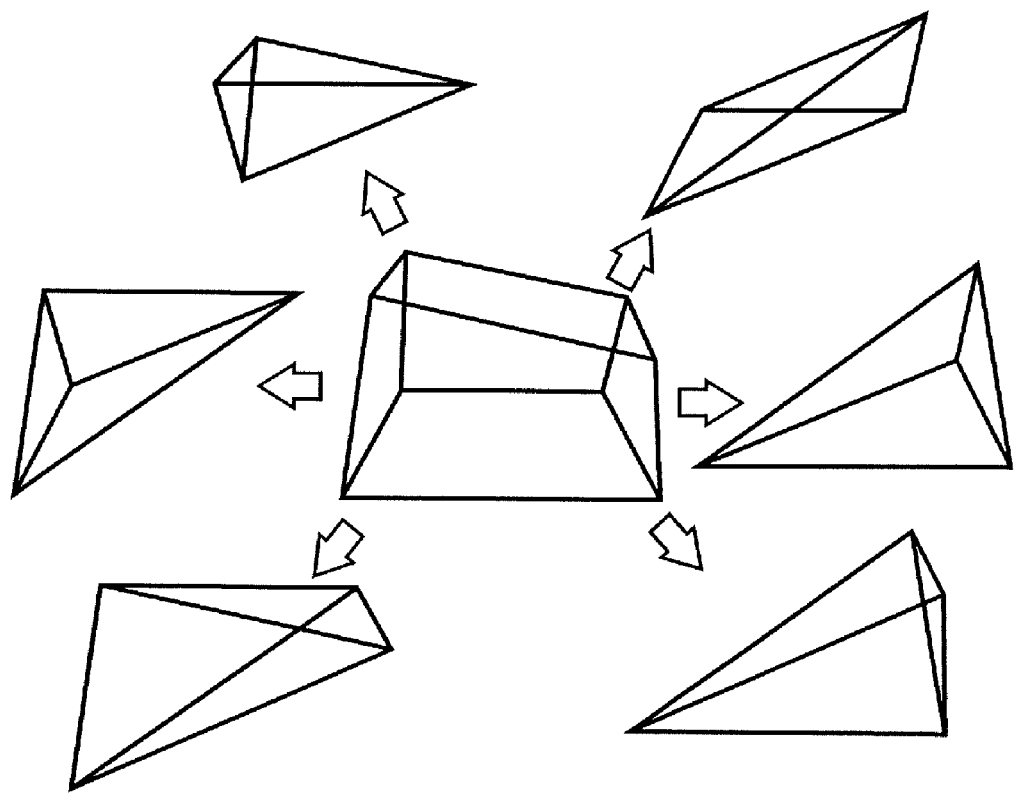
FIG. 12 is a view showing how to divide a hexahedron into tetrahedrons.

As shown in FIG. 5, color gamut data is constituted by, for example, 729 9-sliced device RGB data, that is, 512 hexahedrons. Accordingly, in order to determine whether the CIELab value of the pixel of interest falls inside/outside the color gamut, it is determined whether the CIELab value of the pixel of interest is contained in any one of the plurality of hexahedrons. In the first embodiment, the hexahedron is divided into six tetrahedrons (see FIG. 12), and it is determined whether the CIELab value of the pixel of interest is contained in the hexahedron by executing inside/outside determination for the respective tetrahedrons.

Figure 13:
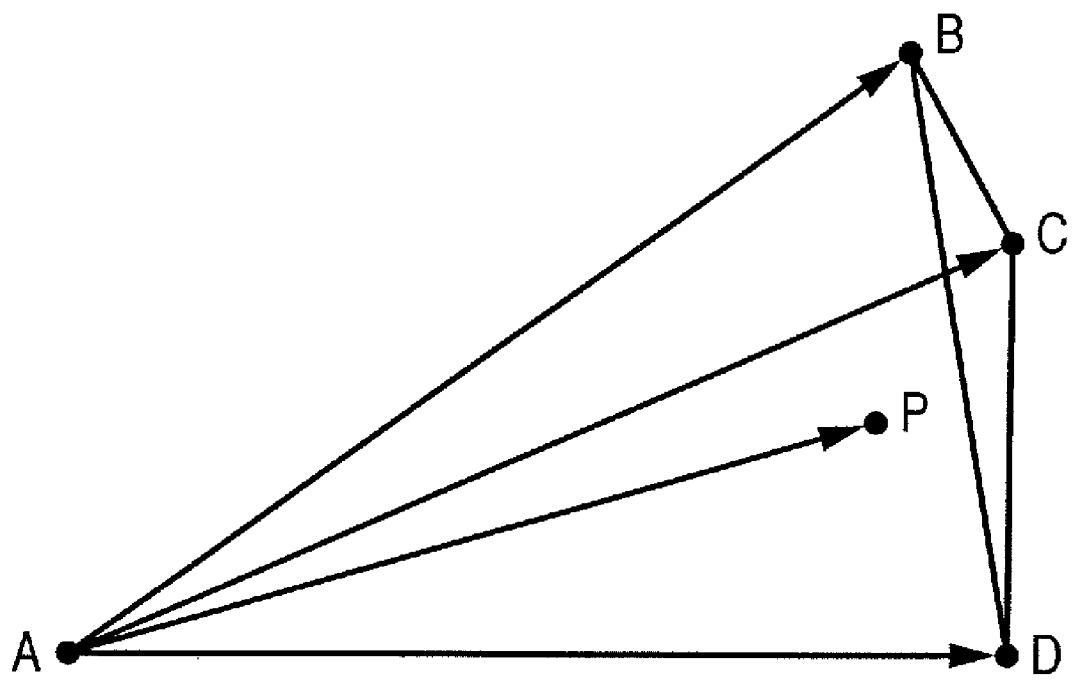
FIG. 13 is a view for explaining inside/outside determination using the tetrahedron.

As shown in FIG. 13, let each vertex (the corrected CIELab value of the grid point of the vertex) of the tetrahedron be A, B, C, and D, and let an input point (the CIELab value of the pixel of interest) be P. Then, the relationship between these points is expressed by:

$$\vec{AP} = s\vec{AB} + t\vec{AC} + u\vec{AD} \tag{4}$$

If the point P is contained in the tetrahedron ABCD, relations (5) below hold:

$$s+t+u \leq 1$$

$$s \geq 0, t \geq 0, u \geq 0 \tag{5}$$

When relations (5) hold, the point P is determined to fall inside the tetrahedron ABCD.

When the above-described tetrahedron inside/outside determination is executed for the six tetrahedrons, one hexahedron inside/outside determination is complete. By applying hexahedron inside/outside determination to the plurality of hexahedrons, the CIELab value of the pixel of interest is determined to fall inside or outside of the color gamut.

Mapping

Figure 14:
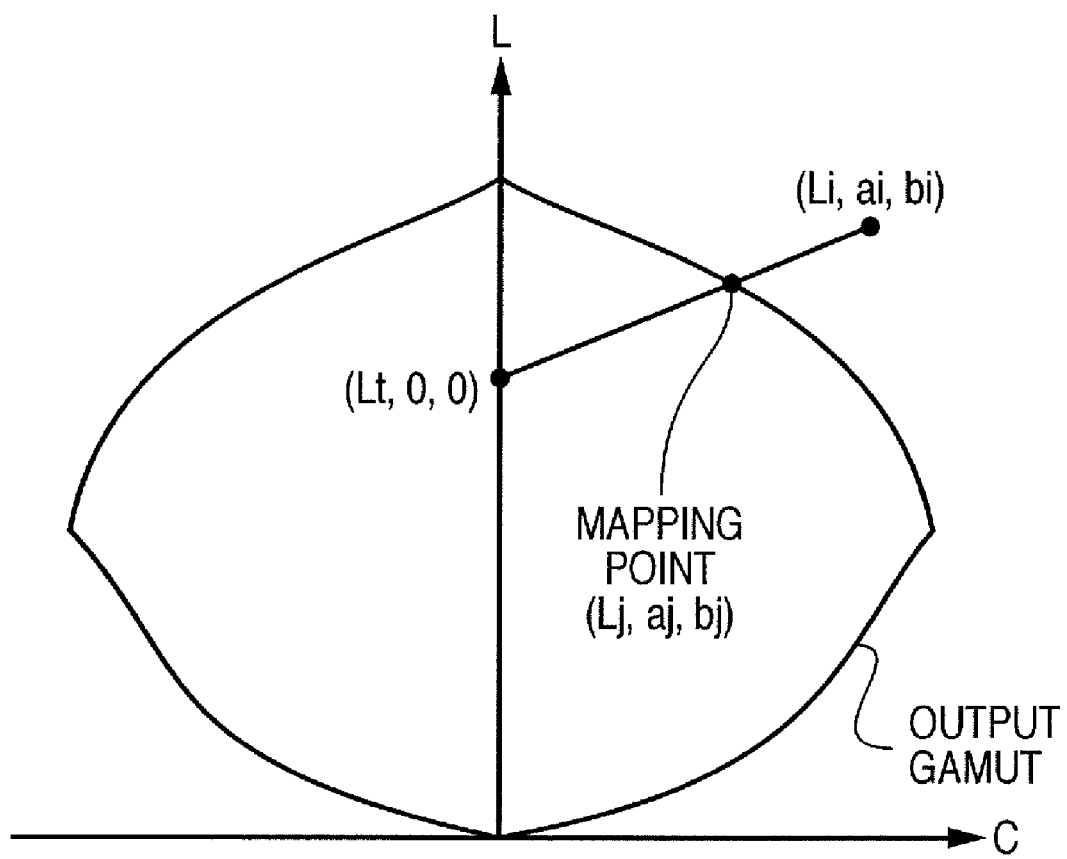
FIG. 14 is a view for explaining a mapping method.

FIG. 14 is a view for explaining the mapping method.

First, a point (Lt,0,0) is set on the lightness L axis as a focus point (convergence point). An input point (Li,ai,bi) is mapped to an intersection point (Lj,aj,bj) of the line, which connects the input point (the corrected CIELab value of the pixel of interest) (Li,ai,bi) and the focus point (Lt,0,0), and the boundary surface of the corrected output gamut. A lightness Lt of the focus point may be fixed to, for example, 50, or may be dynamically calculated from a lightness Li of the input point.

Operation Method of Mapping Point

The operation method of the intersection point (mapping point) (Lj,aj,bj) with the boundary surface of the corrected output gamut, which is the mapping destination of the input point (Li,ai,bi), will be described.

Any one of R, G, and B values of data corresponding to the boundary surface of the output gamut is 0 or 255. More specifically, as shown in FIG. 15, it is classified into six surfaces of a surface with R=255 (R255 plane), surface with G=255 (G255 plane), surface with B=255 (B255 plane), surface with R=0 (R0 plane), surface with G=0 (G0 plane), and surface with B=0 (B0 plane). Each plane includes 81 grid points, that is, 128 triangular patches. The Lab values corresponding to the vertices of these triangular patches are obtained.

For each of the 128 triangular patches of each plane, the intersection point with the line which connects the input point and focus point is calculated. The intersection point can be easily calculated from the equation of the plane of each triangular patch and that of the line. It is then determined whether the intersection point falls inside the triangular patch.

Note that this determination is the two-dimensional version of the above-described tetrahedron inside/outside determination. More specifically, as shown in FIG. 16, let the vertices of the triangular patch be A, B, C, and D, and let the intersection point be P. Then, the relationship between these points is expressed by:

$$\vec{AP} = s\vec{AB} + t\vec{AC} \qquad (6)$$

When the point P falls inside the triangular patch ABC, relations (7) below hold:

$$s+t \leq 1$$

$$s \geq 0, t \geq 0 \qquad (7)$$

When relations (7) hold, the point P is determined to fall inside that triangular patch, and the intersection point (Lj,aj, bj) obtained from the equation of the plane of the triangular patch and that of the line is the mapping point.

[Image Inverse Corrector]

The inverse process (inverse correction) (S20) of the correction process executed for the output gamut by the output gamut corrector 107, which is executed for the mapped image data by the image inverse corrector 109, will be described next.

Figure 17:
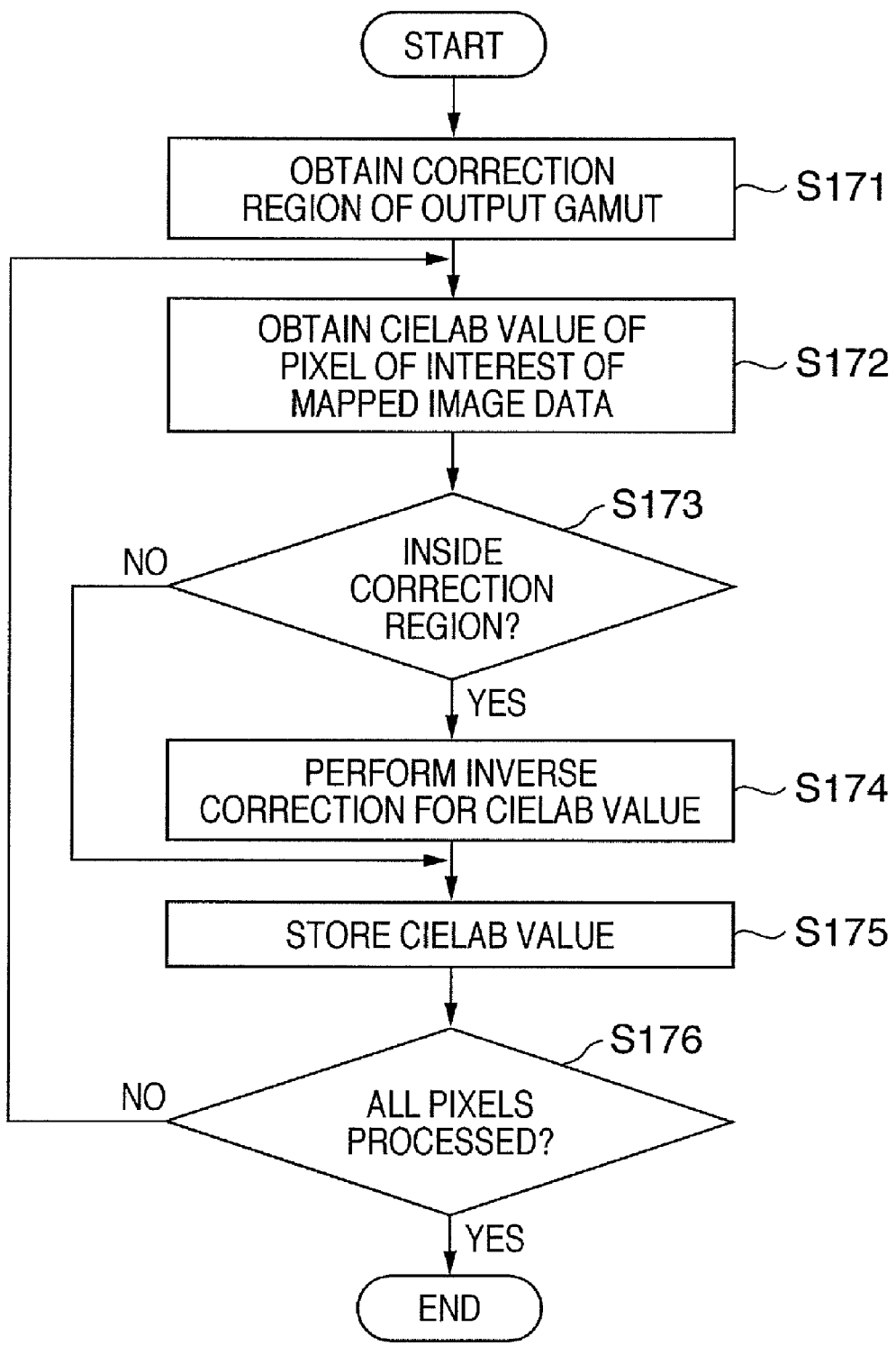
FIG. 17 is a flowchart for explaining the process of an image inverse corrector.

FIG. 17 is a flowchart for explaining the process of the image inverse corrector 109.

The image inverse corrector 109 obtains the x value which indicates the lightness range of the correction region of the output gamut from the buffer memory 111 (S171), and obtains the CIELab value of the pixel of interest from the mapped image data stored in the buffer memory 111 (S172).

The image inverse corrector 109 determines whether the lightness value L of the pixel of interest falls inside the lightness range corresponding to the correction region of the output gamut (S173). When the lightness value L of the pixel of interest falls inside the lightness range, the image inverse corrector 109 performs inverse correction for the CIELab value of the pixel of interest (S174).

In the inverse correction, an inverse process of the process executed by the output gamut corrector 107 for correcting the color gamut data is performed for the pixel of interest so that the corrected color gamut of the output device becomes the color gamut of the output device before the correction. More specifically, the image inverse corrector 109 corrects the corrected white point of the output device on the lightness L axis to the white point of the output device before the correction. Inverse correction amounts of the chromaticity values a and b of the pixel of interest in the a* and b* directions are calculated by:

$$Xa^{-1} = awo \cdot (Li - Lo\min)/(Lwo - Lo\min)$$

$$Xb^{-1} = bwo \cdot (Li - Lo\min)/(Lwo - Lo\min) \qquad (8)$$

where awo and bwo are the correction amounts of the white point W of the output gamut;

Li is the lightness value of the pixel of interest;

Lwo is the lightness value of the white point of the output gamut; and

Lomin is the lightness value of the lower limit of the correction region of the output gamut.

The image inverse corrector 109 adds the correction amounts $Xa^{-1}$ and $Xb^{-1}$ calculated by equation (8) to the chromaticity values a and b of the pixel of interest determined to fall inside the correction region, respectively.

The image inverse corrector 109 stores the CIELab value of the pixel of interest in a predetermined area of the buffer memory 111 (S175), and determines whether all the pixels of the mapped image data have been processed (S176). Until all the pixels have been processed, the processing in steps S172 to S175 is repeated.

[Color Space Value Calculation Section]

The process (S21) executed by the color space value calculation section 110 for converting the image data that underwent the inverse correction into the color space value of the output device 13 will be described next.

Figure 18:
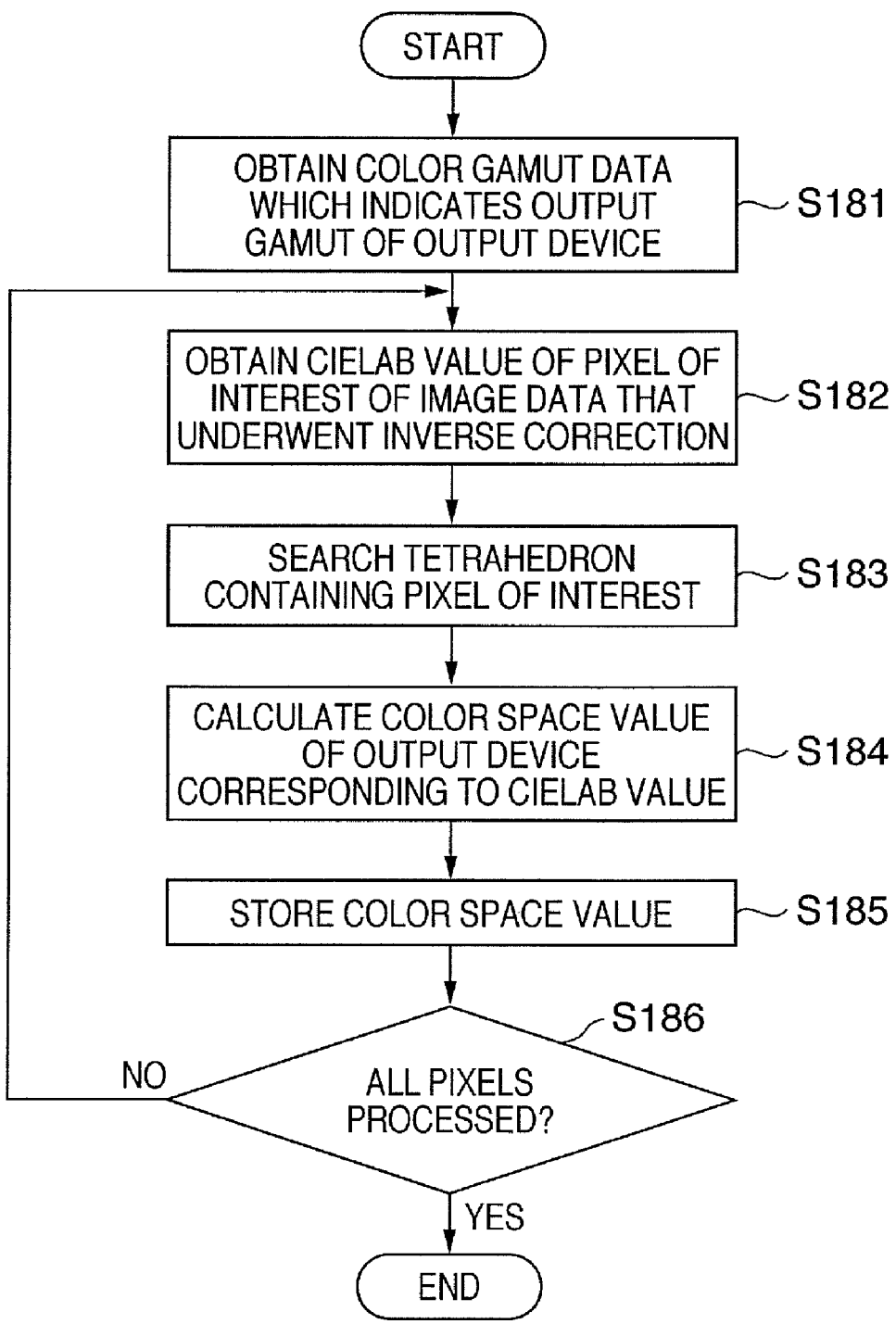
FIG. 18 is a flowchart for explaining the process of a color space value calculation section.

FIG. 18 is a flowchart for explaining the process of the color space value calculation section 110.

The color space value calculation section 110 obtains the color gamut data of the output gamut from the buffer memory 111 (S181). The color gamut data obtained here is not the color gamut data corrected by the output gamut corrector 107 but the uncorrected color gamut data.

The color space value calculation section 110 obtains the CIELab value of the pixel of interest of the image data that underwent the inverse correction from the buffer memory 111 (S182), and searches for the tetrahedron which contains the CIELab value of the pixel of interest from the tetrahedrons which form the output gamut (S183). Note that the search method of the tetrahedron is the same as the above-described tetrahedron inside/outside determination, and a detailed description will not be repeated.

The color space value calculation section 110 calculates the color space value of the output device 13 corresponding to the CIELab value of the pixel of interest by using the tetrahedron as the search result and an interpolation operation (S184).

As described-above, the point P (see FIG. 13) inside the tetrahedron can be expressed as equation (4) and satisfies relations (5). The color space value of the output device 13 can be obtained by applying s, t, and u in equation (4) to:

$$R = Ra + s(Rb - Ra) + t(Rc - Ra) + u(Rd - Ra)$$

$$G = Ga + s(Gb - Ga) + t(Gc - Ga) + u(Gd - Ga)$$

$$B = Ba + s(Bb - Ba) + t(Bc - Ba) + u(Bd - Ba) \qquad (9)$$

where Rx, Gx, and Bx are the color space values of a vertex X; and x is A, B, C, or D.

The color space value calculation section 110 stores the color space value of the output device 13 which corresponds to the CIELab value of the pixel of interest in a predetermined area of the buffer memory 111 (S185), and determines whether all the pixels of the image data that underwent the inverse correction have been processed (S186). Until all the pixels have been processed, the processing in steps S182 to S185 is repeated.

As has been described above, when relative colorimetric mapping is performed for the devices of two types which have different white points, it is done by correcting a partial region including the white point for each of the input gamut and that of the output gamut. The mapped data then undergoes inverse correction for the correction amount of the output gamut. Accordingly, relative colorimetric mapping can be implemented which matches the white points of the input and output gamuts while limiting the region in which color impression in image changes before and after mapping to the vicinity of the white point.

Modification of Embodiment

In the first embodiment, the input image data is described using the device RGB values of the input device 12 such as a digital camera or scanner. However, image data expressed in a standard color space such as sRGB, AbodeRGB, or sYCC is also available. In that case, a regular conversion formula is used to convert an RGB value in a standard color space into a CIELab value. Of course, image data represented by CMYK may be used.

In the first embodiment, a CIELab space is used for correction of an input image and output gamut and for mapping. However, the space is not limited to the CIELab space, and any colorimetric space may be used as long as it is a color appearance space obtained by modeling the human visual characteristics. For example, a color appearance space such as a CIECAM97s or CIECAM02 recommended by the CIE may be used.

In the first embodiment, an image data file designated by a user is input. However, input data is not limited to image data, and simple RGB data may be used. This is effective, for example, when the technique described in the first embodiment is applied to generate a color conversion lookup table.

In the first embodiment, 9-sliced RGB color gamut data of the input and output gamuts are used. However, the slice count is not limited to nine, and any count can be used as long as the shapes of the input and output gamuts can be represented. For example, in order to reduce the amount of calculation, the slice count may be reduced to five or seven. The slice count may be increased to 12 or 17 to improve the matching precision. In essence, the proper slice count may be used in accordance with the application purpose of the color processing.

In the first embodiment, a method of performing color gamut mapping by correcting image data so as to match the white points of the input device 12 and output device 13 has been described. However, this method can be applied to a case wherein the black points of the two devices are matched. In this case, a correction region including the black point is determined in accordance with the gap of the black point from the lightness L axis, and image data correction, color gamut mapping, and inverse correction of the mapped image data are performed. Therefore, relative colorimetric mapping can be implemented which matches the black points of devices of two types having different black points, while limiting the region in which color impression changes before and after the mapping to the vicinity of the black point.

When the above-described case wherein the white points are matched is combined with the case wherein the black points are matched, it can be applied to a case wherein both the white and black points are matched.

EXEMPLARY EMBODIMENTS

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-322523, filed Nov. 29, 2006, which is hereby incorporated by reference herein in its entirety.

What is claimed is:

1. A color processing apparatus comprising:
a setting section, arranged to set a correction region of an input gamut in accordance with a chroma of a specific color point of the input gamut, and set a correction region of an output gamut in accordance with a chroma of a specific color point of the output gamut, wherein the specific color points are either white points or black points;
a gamut corrector, arranged to correct the correction region of the output gamut based on the chroma of the specific color point of the output gamut so that the specific color point of the output gamut is mapped on a point on a lightness axis of a color space;
a data corrector, arranged to correct input color data in the correction region of the input gamut so that the specific color point of the input gamut based on the chroma of the specific color point of the input gamut is mapped on a point on the lightness axis of the color space;
a mapping section, arranged to map the corrected color data into the output gamut having the correction region corrected by the gamut corrector; and
an inverse corrector, arranged to perform inverse correction of correction by the gamut corrector to the mapped color data based on the correction region of the output gamut,
wherein the chroma indicates a distance between the lightness axis of the color space and the specific color point, and the correction region is increased from a maximum or minimum lightness point of the input or output gamut in accordance with an increase of the distance until the distance reaches a predetermined value.

2. The apparatus according to claim 1, wherein the gamut corrector corrects the output gamut based on the chroma of the specific color point of the output gamut and the correction region of the output gamut.

3. The apparatus according to claim 1, wherein the data corrector corrects the input color data based on the chroma of the specific color point of the input gamut and the correction region of the input gamut.

4. A color processing method comprising:

using a processor to perform the steps of:

setting a correction region of an input gamut in accordance with a chroma of a specific color point of the input gamut, and setting a correction region of an output gamut in accordance with a chroma of a specific color point of the output gamut, wherein the specific color points are either white points or black points;

correcting the correction region of the output gamut based on the chroma of the specific color point of the output gamut so that the specific color point of the output gamut is mapped on a point on a lightness axis of a color space;

correcting input color data based on the chroma of the specific color point of the input gamut so that the specific color point of the input gamut is mapped on a point on the lightness axis of the color space;

mapping the corrected color data into the output gamut having the correction region corrected in the first correction step; and performing inverse correction of correction executed in the first correction step to the mapped color data based on the correction region of the output gamut, wherein the chroma indicates a distance between the lightness axis of the color space and the specific color point, and the correction region is increased from a maximum or minimum lightness point of the input or output gamut in accordance with an increase of the distance until the distance reaches a predetermined value.

5. A non-transitory computer-readable medium storing a computer executable program for causing a computer to implement a color processing apparatus according to claim 1.

* * * * *